(12) United States Patent
Kohli

(10) Patent No.: US 11,271,915 B2
(45) Date of Patent: Mar. 8, 2022

(54) AUTHENTICATING A USER ASSOCIATED WITH A PLURALITY OF USER DEVICES USING A PLURALITY OF TYPES OF AUTHENTICATION INFORMATION

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 254 days.

(21) Appl. No.: 16/452,168

(22) Filed: Jun. 25, 2019

(65) Prior Publication Data

US 2020/0412703 A1 Dec. 31, 2020

(51) Int. Cl.
| | |
|---|---|
| *H04L 29/06* | (2006.01) |
| *G06F 21/62* | (2013.01) |
| *H04W 12/08* | (2021.01) |
| *H04W 12/06* | (2021.01) |

(52) U.S. Cl.
CPC .......... *H04L 63/08* (2013.01); *G06F 21/6245* (2013.01); *H04L 63/102* (2013.01); *H04W 12/06* (2013.01); *H04W 12/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,591,224 | B1* | 7/2003 | Sullivan | G07C 9/37 |
| | | | | 702/179 |
| 8,595,804 | B2* | 11/2013 | Pratt | G06F 21/32 |
| | | | | 726/5 |
| 9,160,743 | B2* | 10/2015 | Anantharaman | H04L 12/2816 |
| 9,392,460 | B1* | 7/2016 | Blake | H04L 67/306 |

(Continued)

OTHER PUBLICATIONS

International Search Report and Written Opinion for Application No. PCT/US2020/028745 dated Jul. 16, 2020 (7 pages).

*Primary Examiner* — Harris C Wang
(74) *Attorney, Agent, or Firm* — Michael Best & Friedrich LLP

(57) ABSTRACT

A system for authenticating a user associated with a plurality of user devices using a plurality of types of authentication information. The system includes an electronic computing device including an electronic processor. The electronic processor is configured to receive, from a user device, a request to access sensitive information and send, to the user device, a request for a first accuracy measurement for a first type of authentication information. When first accuracy measurement is below a predetermined threshold, the electronic processor sends to the user device a request for a second accuracy measurement for a second type of authentication information. When the second accuracy measurement is above or equal to the predetermined threshold, the electronic processor authenticates the user and lowers the predetermined threshold for each user device associated with a user profile, records an anomaly associated with the first type of the authentication information, or both.

20 Claims, 4 Drawing Sheets

(56) References Cited

U.S. PATENT DOCUMENTS

| | | | | |
|---|---|---|---|---|
| 2002/0154793 | A1* | 10/2002 | Hillhouse | G06K 9/00087 |
| | | | | 382/115 |
| 2004/0036574 | A1* | 2/2004 | Bostrom | G07C 9/38 |
| | | | | 340/5.82 |
| 2013/0067547 | A1* | 3/2013 | Thavasi | G06F 21/31 |
| | | | | 726/7 |
| 2014/0143149 | A1* | 5/2014 | Aissi | G06F 21/629 |
| | | | | 705/44 |
| 2014/0172707 | A1* | 6/2014 | Kuntagod | G06Q 20/405 |
| | | | | 705/44 |
| 2014/0230032 | A1 | 8/2014 | Duncan | |
| 2015/0161370 | A1* | 6/2015 | North | G06F 21/32 |
| | | | | 726/5 |
| 2016/0005038 | A1* | 1/2016 | Kamal | G06Q 20/405 |
| | | | | 705/44 |
| 2016/0127900 | A1* | 5/2016 | John Archibald | H04W 12/50 |
| | | | | 726/7 |
| 2016/0304040 | A1* | 10/2016 | Narisawa | G06F 9/524 |
| 2018/0218212 | A1* | 8/2018 | Yoshikawa | G06F 21/32 |
| 2019/0122024 | A1* | 4/2019 | Schwartz | G06K 9/001 |
| 2020/0053077 | A1* | 2/2020 | Merrell | H04L 63/0861 |

\* cited by examiner

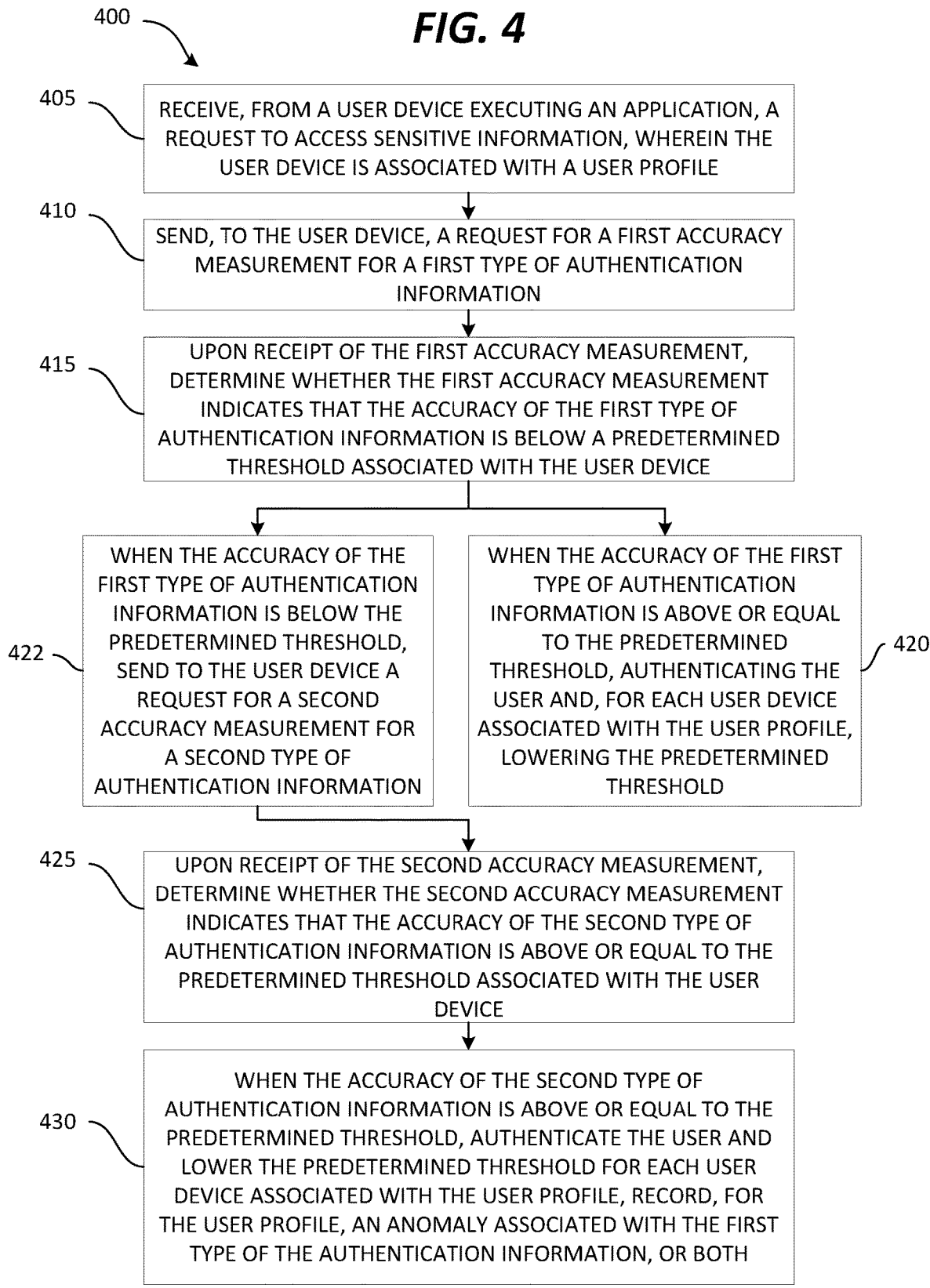

AUTHENTICATING A USER ASSOCIATED WITH A PLURALITY OF USER DEVICES USING A PLURALITY OF TYPES OF AUTHENTICATION INFORMATION

BACKGROUND

Users today have a plurality of devices with a plurality of applications providing access to data, including sensitive data. Sensitive data includes banking information (for example, account and routing numbers), credit card information, healthcare information (for example, insurance policy numbers), identifying information (for example, social security numbers and driver's license numbers), and the like. Each device associated with a user may use one or more types of authentication information to verify the identity of a user (authenticate a user) before access to data that is sensitive to the user is granted. For example, a device may be required to receive a user name and password, public key infrastructure (PKI) certificates, a one-time password (OPT), or biometric information before an executing application provides sensitive data. A user is authenticated when the provided information matches stored information.

The need to continuously authenticate a user on different devices uses a large amount of processing power and can take up a significant amount of a user's time, especially when there is an anomaly associated with the user for one or more of the types of authentication information, such as biometric information.

SUMMARY

Therefore, embodiments herein describe, among other things, a system and method for authenticating a user associated with a plurality of user devices using a plurality of types of authentication information. The systems and methods described herein adjust the types of authentication information requested and the predetermined thresholds for a user based on a user's previous authentications. For example, if a user has a sore throat that makes it difficult for the user to authenticate their identity through voice recognition (i.e., the temporary voice change constitutes an anomaly), it may be desirable that, after a user has previously authenticated themselves via one device, each device associated with the user refrain from asking for a voice sample to authenticate the user, lower the predetermined threshold of user devices associated with the user, or both. Such adjustments decrease the likelihood that a user will have to provide multiple types of superfluous authentication information before their identity is finally authenticated. These adjustments also decrease the likelihood that a user is unable to authenticate their identity for an application executing on a device. Thus, systems and methods reduce the amount of time a user spends verifying their identity and reduce the computing resources required to verify a user's identity. The match between user-provided (during verification) and previously-stored authentication information does not have to be exact but needs to reach or be above a predetermined threshold for a user to be authenticated. For example, there may need to be a 95% match between provided biometric information and stored biometric information for a user to be authenticated.

One embodiment describes a system for authenticating a user associated with a plurality of user devices using a plurality of types of authentication information. The system includes an electronic computing device including an electronic processor. The electronic processor is configured to receive, from a user device executing an application, a request to access sensitive information, wherein the user device is associated with a user profile. The electronic processor is also configured to send, to the user device, a request for a first accuracy measurement for a first type of authentication information and upon receipt of the first accuracy measurement, determine whether the first accuracy measurement indicates that the accuracy of the first type of authentication information is below a predetermined threshold associated with the user device. When the accuracy of the first type of authentication information is below the predetermined threshold, the electronic processor is configured to send to the user device a request for a second accuracy measurement for a second type of authentication information and upon receipt of the second accuracy measurement, determine whether the second accuracy measurement indicates that the accuracy of the second type of authentication information is above or equal to the predetermined threshold associated with the user device. When the accuracy of the second type of authentication information is above or equal to the predetermined threshold, the electronic processor is further configured to authenticate the user and lower the predetermined threshold for each user device associated with the user profile, record, for the user profile, an anomaly associated with the first type of the authentication information, or both.

Another embodiment describes a method of authenticating a user associated with a plurality of user devices using a plurality of types of authentication information. The method includes generating, with a user device, a request to access sensitive information, wherein the user device is associated with a user profile and requesting, with the user device, a first type of authentication information. The method also includes determining whether the accuracy of the first type of authentication information is below a predetermined threshold associated with the user device, upon receipt of the first type of authentication information. The method further includes authenticating, with the user device, the user and sending, to an electronic computing device, a notification of successful authentication when the accuracy of the first type of authentication information is above or equal to the predetermined threshold and for each of the plurality of user devices associated with the user profile, lowering the predetermined threshold upon receipt by the electronic computing device of the notification of successful authentication.

Yet another embodiment describes a non-transitory computer-readable medium with computer-executable instructions stored thereon, executed by an electronic processor, to perform the method of authenticating a user associated with a plurality of user devices using a plurality of types of authentication information. The method includes receiving, from a user device executing an application, a request to access sensitive information wherein the user device is associated with a user profile and sending, to the user device, a request for a first type of authentication information. The method also includes upon receipt of the first accuracy measurement the first type of authentication information, determining a first accuracy measurement for the first type of authentication information. The method further includes determining whether the first accuracy measurement indicates that the accuracy of the first type of authentication information is below a predetermined threshold associated with the user device and when the accuracy of the first type of authentication information is below the predetermined threshold, sending to the user device, a request for a second accuracy measurement for a second type of authentication information. The method also includes upon receipt of the second accuracy measurement, determining whether the second accuracy measurement indicates that the accuracy of the second type of authentication information is above or equal to a predetermined threshold associated with the user device and, when the accuracy of the second type of authentication information is above or equal to the predetermined threshold, authenticating the user and recording, for the user profile, an anomaly for the first type of authentication information, lowering the predetermined threshold for each user device associated with the user profile, or both.

BRIEF DESCRIPTION OF THE FIGURES

FIG. 4 is a flow chart of a method of authenticating a user associated with a plurality of user devices using a plurality of types of authentication information in accordance with some embodiments.

DETAILED DESCRIPTION OF THE EMBODIMENTS

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
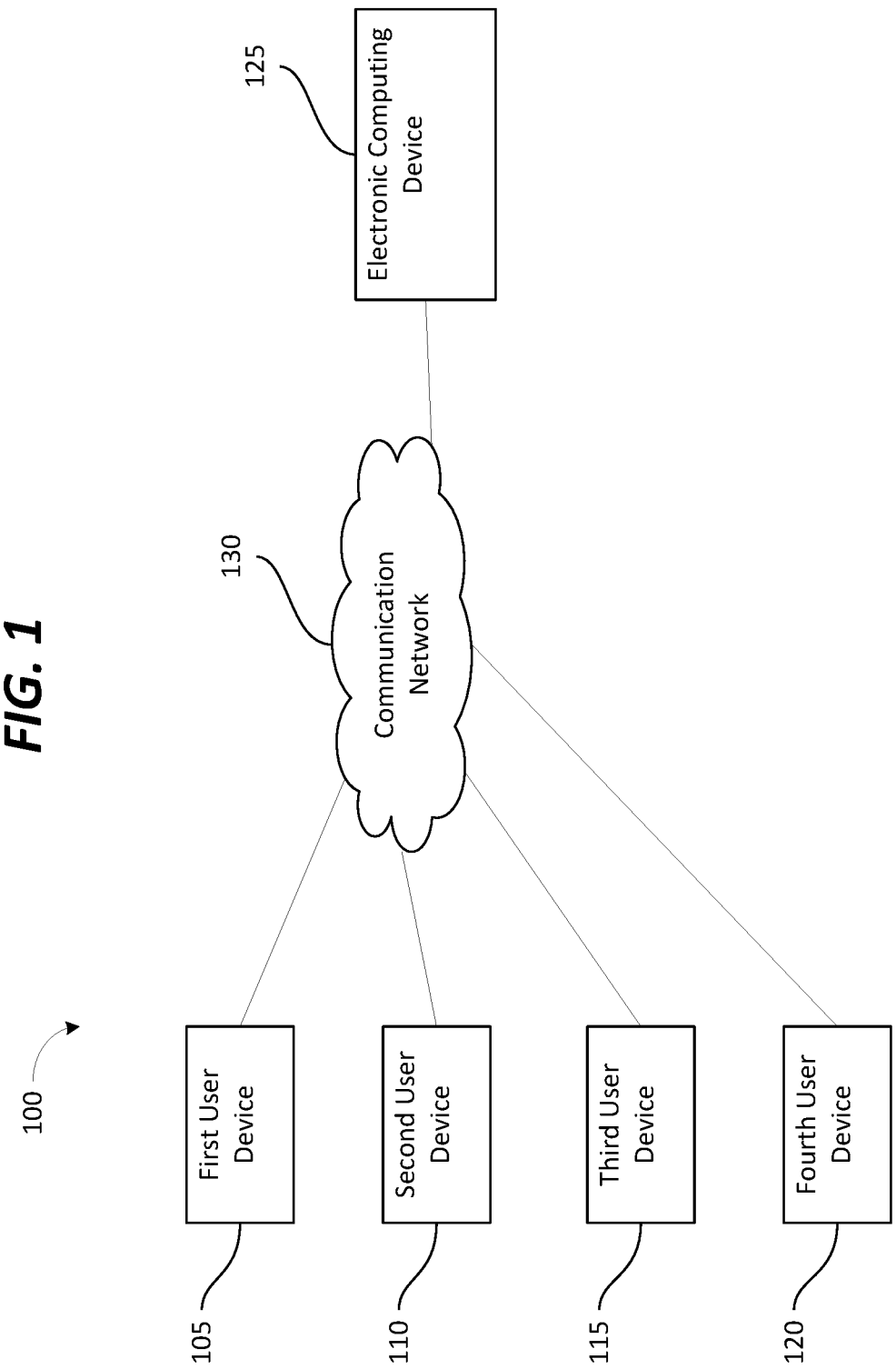
FIG. 1 is a block diagram of a system for authenticating a user associated with a plurality of user devices using a plurality of types of authentication information in accordance with some embodiments.

FIG. 1 is a block diagram of a system 100 for authenticating a user associated with a plurality of user devices using a plurality of types of authentication information. In the example shown, the system 100 includes a first user device 105, a second user device 110, a third user device 115, and a fourth user device 120 (referred to herein collectively as the user devices 105, 110, 115, 120) and an electronic computing device 125. The electronic computing device 125 and user devices 105, 110, 115, 120 are communicatively coupled via a communication network 130. The communication network 130 is an electronic communications network including wireless and wired connections. The communication network 130 may be implemented using a variety of one or more networks including, but not limited to, a wide area network, for example, the Internet; a local area network, for example, a Wi-Fi network; or a near-field network, for example, a Bluetooth™ network.

It should be understood that the system 100 may include a different number of user devices and that the four user devices 105, 110, 115, 120 included in FIG. 1 are purely for illustrative purposes. It should also be understood that the system 100 may include a different number of electronic computing devices than the number of electronic computing devices illustrated in FIG. 1 and the functionality described herein as being performed by the electronic computing device 125 may be performed by a plurality of electronic computing devices. It should be understood that some of the functionality described herein as being performed by the electronic computing device 125 may be performed by a user device. It should also be understood that some of the functionality described herein as being performed by a user device may be performed by the electronic computing device 125.

In the embodiment illustrated in FIG. 1, the electronic computing device 125 is, for example, a server that is configured to authenticate a user. In the embodiment illustrated in FIG. 1, the user devices 105, 110, 115, 120 are electronic computing devices (for example, a smart telephone, a laptop computer, a desktop computer, a smart wearable, a smart appliance, a smart home assistant, or other type of electronic computing device configured to operate as described herein). It should be noted that each of the user devices 105, 110, 115, 120 may be any one of the above mentioned options regardless of which of the above mentioned options are the other user devices in the system 100. For example, in one embodiment the first user device 105 may be a smart telephone while the second user device 110 may be a smart wearable.

Figure 2:
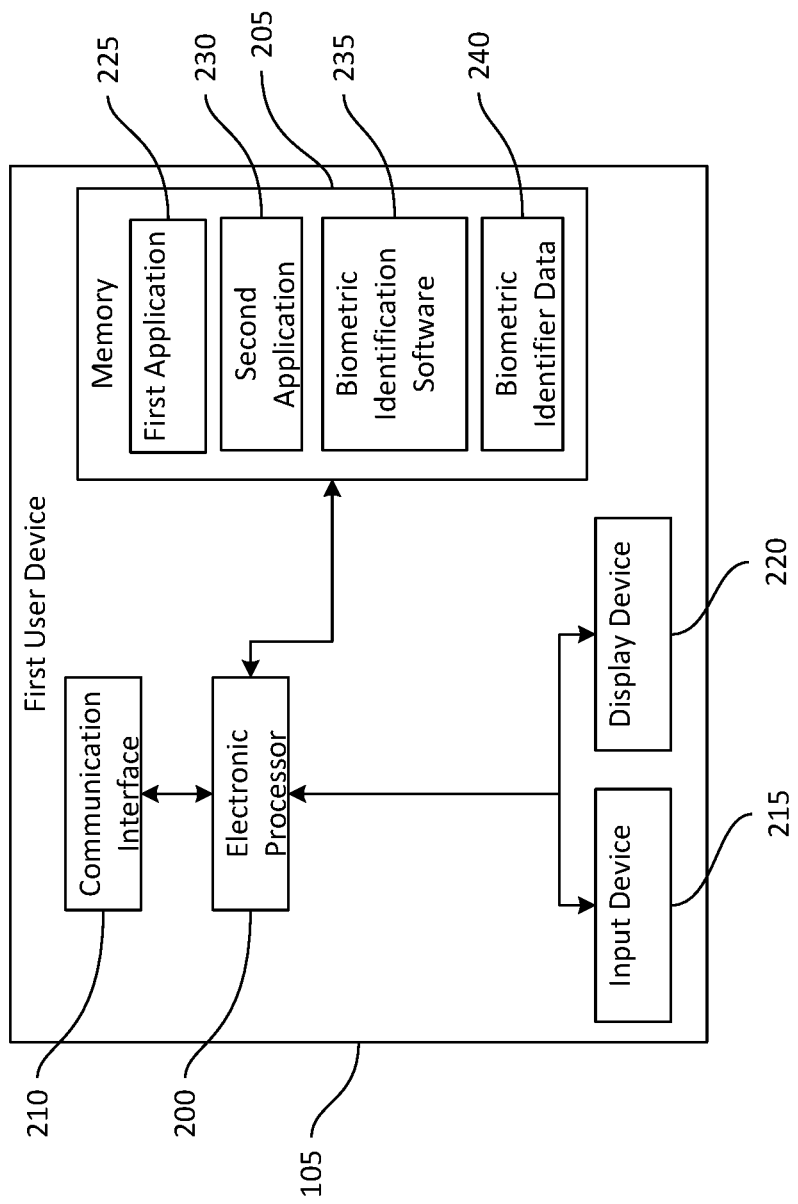
FIG. 2 is a block diagram of a user device of the system of FIG. 1 in accordance with some embodiments.

FIG. 2 is a block diagram of an example of the first user device 105. As illustrated in FIG. 2, the first user device 105 is an electronic computing device that includes an electronic processor 200 (for example, a microprocessor, application-specific integrated circuit (ASIC), or another suitable electronic device), a memory 205 (a non-transitory, computer-readable storage medium), and a communication interface 210, such as a transceiver, for communicating over the communication network(s) 130 and, optionally, over one or more additional communication networks or connections. The communication interface 210 allows the first user device 105 to communicate with the electronic computing device 125 over the communication network(s) 130.

The first user device 105 also includes an input device 215 and a display device 220. The display device 220 may include, for example, a touchscreen, a liquid crystal display ("LCD"), a light-emitting diode ("LED"), a LED display, an organic LED ("OLED") display, an electroluminescent display ("ELD"), and the like. The input device 215 may include, for example, a keypad, a mouse, a touchscreen (for example, as part of the display device 220), a microphone, a camera, a retinal scanner, fingerprint scanner, or the like (not shown). The electronic processor 200, the memory 205, the communication interface 210, the input device 215, and the display device 220 communicate wirelessly, over one or more communication lines or buses, or a combination thereof. It should be understood that the first user device 105 may include additional components than those illustrated in FIG. 2 in various configurations and may perform additional functionality than the functionality described herein. For example, in some embodiments, the first user device 105 includes multiple electronic processors, multiple memories, multiple communication interfaces, multiple input devices, multiple output devices, or a combination thereof. Also, it should be understood that, although not described or illustrated herein, the second user device 110, third user device 115, and fourth user device 120 may include similar components and perform similar functionality as the first user device 105.

As illustrated in FIG. 2, the memory 205 included in the first user device 105 includes a first application 225, a second application 230, biometric identification software 235, and biometric identifier data 240. The first application 225 and the second application 230 are software applications that allow a user to access sensitive information. For example, the first application 225 and second application 230 may allow access to a user's bank account, credit card, healthcare information, unique identifier, or the like when a user's identity is authenticated. A user's identity is authenticated using one or more types of authentication information. Types of authentication information include, for example, a username, password, public key infrastructure (PKI) certificate, a one-time password (OPT), and a biometric identifier such as an image of a face, an audio clip of a voice, a digital representation of a retina, a digital representation of a fingerprint, and the like. The biometric identifier data 240 includes previously provided biometric identifiers, each associated with a user. In some embodiments, a plurality of users are associated with the first user device 105 and the biometric identifier data 240 includes one or more biometric identifiers for each of the plurality of users associated with the first user device 105.

The electronic processor 200 is configured to execute the biometric identification software 235, to determine a degree of similarity, referred to herein as an accuracy measurement, between a provided biometric identifier and a stored biometric identifier for the user whose identity is being authenticated. In other words, the accuracy measurement is an indication of how closely authentication information provided by the user matches stored authentication information. It should be understood that the provided biometric identifier and the stored biometric identifier are generally the same type of biometric identifier. In one example, the electronic processor 200 receives a digital representation of a fingerprint and compares the provided digital representation of a fingerprint to a stored digital representation of a fingerprint of the user whose identity is being authenticated. Based on the comparison, the electronic processor 200 determines an accuracy measurement for the provided digital representation of the fingerprint. For example, the accuracy measurement may be 70%, indicating that 70% of the provided biometric identifier matches the stored biometric identifier for the user whose identity is being authenticated. It should be understood that, in some embodiments, the functionality described above as being performed by the electronic processor 200, when executing the biometric identification software 235 is performed by the electronic computing device 125. Additionally, in some embodiments, the biometric identifier data 240 is stored in the memory of the electronic computing device 125 rather than the memory 205.

Figure 3:
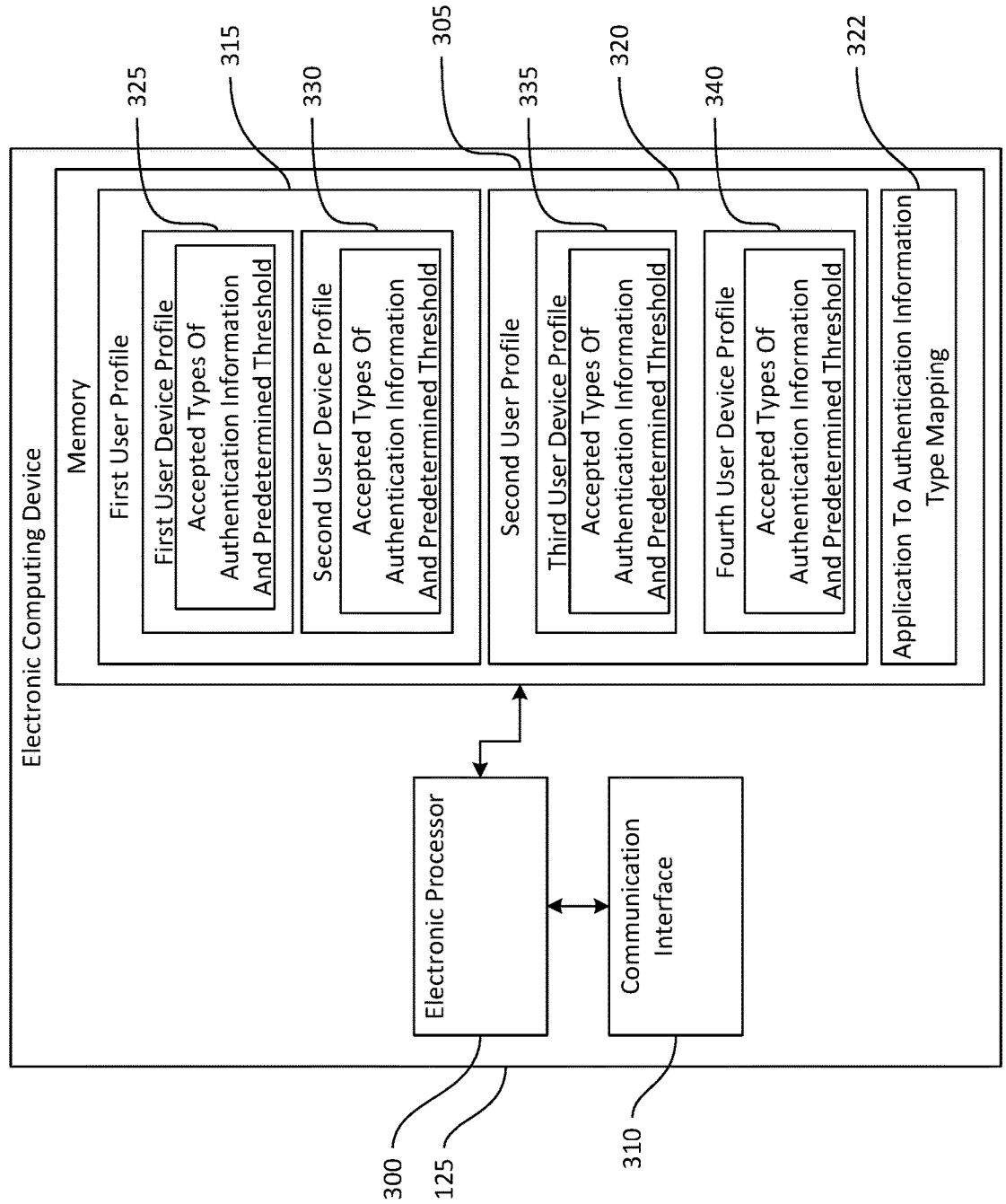
FIG. 3 is a block diagram of an electronic computing device of the system of FIG. 1 in accordance with some embodiments.

FIG. 3 is a block diagram of an example of the electronic computing device 125. As illustrated in FIG. 3, the electronic computing device 125 includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication network(s) 130 and, optionally, one or more additional communication networks or connections. The communication interface 310 allows the electronic computing device 125 to communicate with the user devices 105, 110, 115, 120 over the communication network(s) 130.

As illustrated in FIG. 3, the memory 305 included in the electronic computing device 125 includes a first user profile 315, a second user profile 320, and an application to authentication information type mapping 322. Each user profile is associated with one user and assigned a unique identifier. Each user profile is associated with one or more user devices and includes unique identifiers of the user devices it is associated with. In the example illustrated in FIG. 3, the first user profile 315 includes a first user device profile 325 including a unique identifier of the first user device 105 and a second user device profile 330 including a unique identifier of the second user device 110. The second user profile 320 includes a third user device profile 335 including a unique identifier of the third user device 115 and a fourth user device profile 340 including a unique identifier of the fourth user device 120. Each user profile also includes, for each user device associated with the user profile, types of authentication information accepted by the user device, as well as a predetermined threshold. For example, the first user profile 315 may indicate that the first user device 105 accepts a digital representation of a fingerprint as a type of authentication information and when an accuracy measurement for the provided fingerprint is greater than or equal to 90%, a user is authenticated.

The application to authentication information type mapping 322 defines, for each application that allows access to sensitive information, types of authentication information accepted by the application. For example, the application to authentication information type mapping 322 may map a unique identifier of the first application 225 to a digital representation of a fingerprint and audio clip of a voice. In this example, the first application 225 will only allow access to sensitive information when a user is authenticated via a provided fingerprint or vocal sample. In some embodiments, the electronic computing device 125 communicates with other electronic computing devices belonging to application providers or device manufacturers to determine types of authentication information accepted by applications and user devices.

It should be noted that the memory 305 may include a different number of user profiles and that the two user profiles 315 and 320 included in FIG. 3 are purely for illustrative purposes. Additionally, the user profiles included in the memory 305 may be associated with a different number of user devices than the two user devices that the first user profile 315 and the second user profile 320 are each illustrated in FIG. 3 as being associated with.

FIG. 4 is a flow chart illustrating a method 400 of authenticating a user associated with a plurality of user devices using a plurality of types of authentication information. At step 405, the electronic processor 300 receives, from a user device (for example, the first user device 105 associated with the first user profile 315) executing an application (for example the first application 225), a request, generated by the user device, to access sensitive information. For example, the first user device 105, when executing a retail or e-commerce application, allows access to a user's credit card information via the retail application upon request. It should be understood that, in some embodiments, the request to access sensitive information includes a unique identifier associated with a user profile in the memory 305, a unique identifier of the application being executed by the user device, and a unique identifier of the user device that generated the request (in this example, the unique identifier of the first user profile 315, the unique identifier of the first application 225, and the unique identifier of the first user device 105). At step 410, the electronic processor 300 sends, to the first user device 105, a request for a first accuracy measurement for a first type of authentication information. The electronic processor 300 determines the type of authentication information to request the first accuracy measurement for by using the unique identifier of the first user device 105 and the unique identifier of the first application 225 to determine types of authentication information accepted by both the first user device 105 and the first application 225.

Upon receiving the request for the first accuracy measurement for the first type of authentication information, the electronic processor 200 generates a prompt or request (output via, for example, the display device 220 or a speaker) for the first type of authentication information. When the electronic processor 200 receives, via the input device 215, authentication information of the first type, the electronic processor 200 compares the received (provided) authentication information to stored authentication information associated with the user being authenticated to determine the first accuracy measurement for the first type of authentication information. For example, when the provided authentication information is a biometric identifier, the electronic processor 200 compares the provided biometric identifier to a biometric identifier associated with the user being authenticated and stored in the biometric identifier data 240. The electronic processor 200 sends the first accuracy measurement to the electronic computing device 125.

At step 415, upon receipt of the first accuracy measurement, the electronic processor 300 determines whether the first accuracy measurement indicates that the accuracy of the first type of authentication information is below a predetermined threshold associated with the user device. For example, the electronic processor 300 determines if the first accuracy measurement is below the predetermined threshold specific to the first user device profile 325 in the first user profile 315.

At step 420, when the accuracy of the first type of authentication information is above or equal to the predetermined threshold, the electronic processor 300 authenticates the user and, for each user device associated with the user profile, lowers the predetermined threshold. For example, if the first accuracy measurement is above or equal to the predetermined threshold specific to the first user device profile 325 in the first user profile 315, the electronic processor 300 lowers the predetermined threshold associated with the first user device profile 325 and the second user device profile 330 in the first user profile 315.

In some embodiments, in addition to lowering the predetermined threshold, the electronic processor 300, for each user device associated with the user profile, increases a false acceptance rate (FAR) associated with the user device. A FAR is a predetermined threshold representing the acceptable likelihood that provided or received biometric data belongs to an unauthorized user. For example, when the electronic processor 200 receives a biometric identifier, the electronic processor 200 may compute the likelihood that the received biometric identifier does not belong to the user being authenticated. If the likelihood that the received biometric identifier does not belong to the user being authenticated is greater than the FAR, the electronic processor 300 does not authenticate the user. The likelihood that the received biometric identifier does not belong to the user being authenticated may be greater than the FAR when, for example, the provided biometric data belongs to a different user than the user being authenticated or the provided biometric data belongs to the user being authenticated but is distorted (for example, due to the user being ill). Increasing the FAR increases the likelihood that, when distorted biometric data belonging to the user being authenticated is provided, the user will be authenticated.

It should be noted that, in some embodiments, when the electronic processor 300 authenticates a user, the user is authenticated for each application installed on the user device and therefore is allowed access to sensitive information via each application installed on the user device. In other embodiments, when the electronic processor 300 authenticates a user, the user is authenticated for only the currently executing application and therefore is only allowed access to sensitive information via the currently executing application. After step 420 the method 400 ends.

It should be understood that, in some embodiments, electronic processor 200 does not send the first accuracy measurement to the electronic computing device 125. Instead, the electronic processor 200 determines whether the first accuracy measurement indicates that the accuracy of the first type of authentication information is below a predetermined threshold associated with the first user device 105 and the predetermined threshold associated with the first user device 105 is stored in the memory 205. The electronic processor 200 authenticates the user when the accuracy of the first type of authentication information is above or equal to the predetermined threshold and sends a notification of successful authentication to the electronic computing device 125. The electronic processor 300, for each user device associated with the first user profile 315, lowers the predetermined threshold and sends each lowered predetermined threshold to the user device it is associated with for storage in the memory of the user device. In addition, in some embodiments, instead of sending the request to access sensitive information to the electronic computing device 125, the electronic processor 200 determines the first type of authentication information to request from the user using accepted types of authentication information stored in the memory 205 (for example, types of authentication information accepted by both the first user device 105 and the first application 225).

At step 422, when the accuracy of the first type of authentication information is below the predetermined threshold, the electronic processor 300 sends, to the first user device 105, a request for a second accuracy measurement for a second type of authentication information. The electronic processor 300 determines the second type of authentication information to request in a similar manner as described above in relation to requesting the first type of authentication information.

Upon receiving the request for a second accuracy measurement, the electronic processor 200 determines the second accuracy measurement for the second type of authentication information in the same manner the electronic processor 200 determines the first accuracy measurement for the first type of authentication information. The electronic processor 200 sends the second accuracy measurement for the second type of authentication information to the electronic computing device 125.

At step 425, upon receipt of the second accuracy measurement, the electronic processor 300 determines whether the second accuracy measurement indicates that the accuracy of the second type of authentication information is above or equal to the predetermined threshold associated with the first user device 105. For example, the electronic processor 300 determines if the second accuracy measurement is below the predetermined threshold specific to the first user device profile 325 and the first user profile 315. At step 430, when the accuracy of the second type of authentication information is above or equal to the predetermined threshold, the electronic processor 300 authenticates the user and lowers the predetermined threshold for each user device associated with the user profile, records, for the user profile, an anomaly associated with the first type of the authentication information, or both. For example, in some embodiments, when the electronic processor 300 determines if the second accuracy measurement is below the predetermined threshold specific to the first user device profile 325 and the first user profile 315, the electronic processor 300 lowers the predetermined threshold associated with the first user device profile 325 and predetermined threshold associated with the second user device profile 330 in the first user profile 315. In some embodiments, when the electronic processor 300 determines if the second accuracy measurement is below the predetermined threshold specific to the first user device profile 325 in the first user profile 315, the electronic processor 300 records an anomaly associated with the first type of the authentication information for the first user profile 315. As described above, in some embodiments, in addition to lowering the predetermined threshold, the electronic processor 300, for each user device associated with the user profile, increases a false acceptance rate (FAR) associated with the user device. It should be noted that, in some embodiments, when the electronic processor 300 authenticates a user, the user is authenticated for each application installed on the user device and is therefore allowed access to sensitive information via each application installed on the user device. In other embodiments, when the electronic processor 300 authenticates a user, the user is authenticated for only the currently executing application and is therefore only allowed access to sensitive information via the currently executing application.

It should be understood that, in some embodiments, electronic processor 200 does not send the second accuracy measurement to the electronic computing device 125. Instead, the electronic processor 200 determines whether the second accuracy measurement indicates that the accuracy of the second type of authentication information is below a predetermined threshold associated with the first user device 105 and the predetermined threshold associated with the first user device 105 is stored in the memory 205. The electronic processor 200 authenticates the user when the accuracy of the first type of authentication information is above or equal to the predetermined threshold and sends a notification of successful authentication and an unsuccessful authentication attempt using the first type of authentication information to the electronic computing device 125. The electronic processor 300, for each user device associated with the first user profile 315, lowers the predetermined threshold and sends each lowered predetermined threshold to the user device it is associated with for storage in the memory of the user device. The electronic processor 300 may also record an anomaly associated with the first type of authentication information and send a notification of the anomaly associated with the first type of the authentication information to each user device associated with the first user profile 315.

When the electronic processor 300 receives, from the second user device 110 associated with the first user profile 315 (or a user device associated with the first user profile 315 other than the first user device 105), a request to access sensitive information subsequent to recording the anomaly associated with the first type of the authentication information, the electronic processor 300 sends, to the second user device 110, a request for third accuracy measurement for a type of authentication information different than the first type of authentication information. For example, when a user has a black eye that prevents the user from being authenticated using facial recognition via the first user device 105, the electronic processor 300 records, in the first user profile 315, an anomaly associated with facial images for the user (the first type of authentication data). When a request to access sensitive information is subsequently received from the second user device 110 executing an application, the electronic processor 300 determines one or more types of authentication data accepted by the second user device 110 and the executing application. If the electronic processor 300 determines a plurality of types of authentication data accepted by the second user device 110 and the executing application that includes facial images, the electronic processor 300 requests accepted types of authentication information other than a facial image. For example, when the electronic processor 300 determines that the second user device 110 and the executing application accept an image of a face, a digital representation of a fingerprint, and an audio clip of a voice as types of authentication information, the electronic processor 300 requests an accuracy measurement for an audio clip of a voice or a digital representation of a fingerprint rather than an image of a face. In some embodiments, when authentication of a user fails for each accepted type of authentication information for which no anomaly is recorded, the electronic processor 300 requests an accuracy measurement for the type of authentication information for which an anomaly has been recorded in the user profile. Continuing with the above example, when the electronic processor 300 cannot authenticate a user with an accuracy measurement for audio clip of a voice or an accuracy measurement for a digital representation of a fingerprint, the electronic processor 300 requests an accuracy measurement for an image of a face.

In some embodiments, the electronic processor 300 receives, from a second user device associated with the user profile (for example, the second user device 110), a request to access sensitive information subsequent to lowering the predetermined threshold. When the electronic processor 300 receives the subsequent request to authenticate the user, the electronic processor 300 sends to the second user device 110 a request for a third accuracy measurement for the first type of authentication information, the second type of authentication information, or another type of authentication information. When the electronic processor 300 receives, from the second user device, the third accuracy measurement, the electronic processor 300 compares the lowered predetermined threshold to the third accuracy measurement. For example, the electronic processor 300 may have lowered the predetermined threshold from 90% to 70% and the user may have a cold causing their voice to sound different. When the electronic processor 300 receives the third accuracy measurement for the audio recording including a voice, the electronic processor 300 determines whether the third accuracy measurement is above or equal to the lowered predetermined threshold associated with the second user device 110. When the third accuracy measurement is greater than or equal to the lowered predetermined threshold associated with the second user device 110, the electronic processor 300 authenticates the user. For example, when the electronic processor 300 receives an accuracy measurement of 75% for the audio recording including a voice, the electronic processor 300 compares the accuracy measurement to the lowered predetermined threshold of 70% and, based on the comparison, authenticates the user. Had the electronic processor 300 not lowered the predetermined threshold of each user device profile associated with the first user profile 315, the user would not have been authenticated when they provided the audio file and the electronic processor 300 would have requested an accuracy measurement for another type of authentication information. If audio files including a voice are the only type of authentication information accepted by both the second user device 110 and the application being executed and the predetermined threshold of 90% is not lowered to 75% or less the user may not be able to access sensitive information in the application executed by the second user device 110.

In some embodiments, the electronic processor 300 receives a request to add a user device to a user profile. For example, the electronic processor 300 may receive a request to add a fifth user device to the first user profile 315 when an application allowing access to sensitive information associated with the user of the first user profile 315 is installed on the fifth user device. In response to receiving the request to add the fifth user device to the first user profile 315, the electronic processor 300 creates a fifth user device profile including a unique identifier for the fifth user device, types of authentication information accepted by the fifth user device, and a predetermined threshold associated with the fifth user device, in the first user profile 315 included in the memory 305 of the electronic computing device 125.

In some embodiments, for each user device associated with a user profile, lowered predetermined thresholds, increased failure acceptance rates, or both are maintained for a predetermined amount of time. After the predetermined amount of time has passed, for each user device associated with the user profile, the lowered predetermined thresholds, increased failure acceptance rates, or both are reverted to their previous values by the electronic processor 300. The predetermined amount of time may be set automatically by the electronic processor 300 or may be set based on preferences received from a user device.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for authenticating a user associated with a plurality of user devices using a plurality of types of authentication information, the system comprising: an electronic computing device including an electronic processor, the electronic processor configured to:
    receive, from a user device executing an application, a request to access sensitive information, wherein the user device is associated with a user profile;
    send, to the user device, a request for a first accuracy measurement for a first type of authentication information;
    upon receipt of the first accuracy measurement, determine whether the first accuracy measurement indicates that the accuracy of the first type of authentication information is below a predetermined threshold associated with the user device;
    when the accuracy of the first type of authentication information is below the predetermined threshold, send to the user device a request for a second accuracy measurement for a second type of authentication information;
    upon receipt of the second accuracy measurement, determine whether the second accuracy measurement indicates that the accuracy of the second type of authentication information is above or equal to the predetermined threshold associated with the user device; and
    when the accuracy of the second type of authentication information is above or equal to the predetermined threshold, authenticate the user and lower the predetermined threshold for each user device associated with the user profile.

2. The system according to claim 1, wherein the electronic processor is further configured to:
    record, for the user profile, an anomaly associated with the first type of the authentication information;
    receive, from a second user device associated with the user profile, a request to access sensitive information subsequent to recording the anomaly; and
    send, to the second user device, a request for a third accuracy measurement for a type of authentication information different than the first type of authentication information.

3. The system according to claim 1, the electronic processor further configured to:
    subsequent to lowering the predetermined threshold for each user device associated with the user profile, receive, from a second user device associated with the user profile, a request to access sensitive information;
    send, to the second user device, a request for a third accuracy measurement for the first type of authentication information, the second type of authentication information, or other type of authentication information; and
    when the third accuracy measurement is above or equal to the predetermined threshold, authenticate the user.

4. The system according to claim 1, wherein the authentication information is one selected from the group consisting of a biometric identifier, public key infrastructure certificate, a one-time password, and a username and password.

5. The system according to claim 1, wherein the electronic processor is further configured to:
revert the lowered predetermined threshold for each user device associated with the user profile to the predetermined threshold, after a predetermined amount of time has passed.

6. The system according to claim 1, wherein a memory of the electronic computing device includes a mapping of a plurality of applications to types of authentication information and each of the plurality of applications is mapped to one or more types of authentication information that the application accepts as authentication for the user.

7. The system according to claim 1, wherein the electronic processor is further configured to:
receive a request to add a second user device to the user profile; and
in response to receiving the request to add a second user device to the user profile, store, in the user profile included in a memory of the electronic computing device, a unique identifier for the second user device, types of authentication information accepted by the second user device, and a predetermined threshold associated with the second user device.

8. The system according to claim 7, wherein the request to add the second user device to the user profile is received when an application allowing access to sensitive information associated with the user is installed in the second user device.

9. A method of authenticating a user associated with a plurality of user devices using a plurality of types of authentication information, the method comprising:
generating, with a user device, a request to access sensitive information, wherein the user device is associated with a user profile;
requesting, with the user device, a first type of authentication information;
upon receipt of the first type of authentication information, determining whether the accuracy of the first type of authentication information is below a predetermined threshold associated with the user device;
when the accuracy of the first type of authentication information is above or equal to the predetermined threshold, authenticating, with the user device, the user and sending, to an electronic computing device, a notification of successful authentication;
when the accuracy of the first type of authentication information is below the predetermined threshold, requesting, with the user device, a second type of authentication information;
upon receipt of the second type of authentication information, determining whether the accuracy of the second type of authentication information is above or equal to the predetermined threshold associated with the user device;
when the accuracy of the second type of authentication information is above or equal to the predetermined threshold, authenticating, with the user device, the user and sending, to the electronic computing device, a notification of successful authentication and an unsuccessful authentication attempt using the first type of authentication information; and
upon receipt by the electronic computing device of a notification of successful authentication, for each of the plurality of user devices associated with the user profile, lower the predetermined threshold.

10. The method according to claim 9, the method further comprising:
generating, with a second user device associated with the user profile, a request to access sensitive information subsequent to receiving the lowered predetermined threshold from the electronic computing device;
requesting, with the second user device, the first type of authentication information or another type of authentication information; and
when the accuracy of the first type of authentication information or another type of authentication information is above or equal to the predetermined threshold, authenticating, with the second user device, the user.

11. The method according to claim 9, the method further comprising:
when the accuracy of the second type of authentication information is above or equal to the predetermined threshold, recording, with the electronic computing device, an anomaly associated with the first type of the authentication information; and
sending, with the electronic computing device, a notification of the anomaly associated with the first type of authentication information to each of the plurality of user devices associated with the user profile.

12. The method according to claim 11, the method further comprising:
generating, with a second user device associated with the user profile, a request to access sensitive information subsequent to receiving the notification of the anomaly associated with the first type of authentication information; and
requesting, with the second user device, a type of authentication information different than the first type of authentication information.

13. The method according to claim 9, the method further comprising:
reverting the lowered predetermined threshold for each of the plurality of user devices associated with the user profile to the predetermined threshold, after a predetermined amount of time has passed.

14. The method according to claim 9, the method further comprising:
receiving, with the electronic computing device, a request to add a second user device to the user profile; and
in response to receiving the request to add a second user device to the user profile, storing, in the user profile included in a memory of the electronic computing device, a unique identifier for the second user device, types of authentication information accepted by the second user device, and a predetermined threshold associated with the second user device.

15. A non-transitory computer-readable medium with computer-executable instructions stored thereon executed by an electronic processor to perform the method of authenticating a user associated with a plurality of user devices using a plurality of types of authentication information, comprising:
receiving, from a user device executing an application, a request to access sensitive information wherein the user device is associated with a user profile;
sending, to the user device, a request for a first type of authentication information;

upon receipt of the first accuracy measurement the first type of authentication information, determining a first accuracy measurement for the first type of authentication information;

determining whether the first accuracy measurement indicates that the accuracy of the first type of authentication information is below a predetermined threshold associated with the user device;

when the accuracy of the first type of authentication information is below the predetermined threshold, sending to the user device a request for a second accuracy measurement for a second type of authentication information;

upon receipt of the second accuracy measurement, determining whether the second accuracy measurement indicates that the accuracy of the second type of authentication information is above or equal to the predetermined threshold associated with the user device;

when the accuracy of the second type of authentication information is above or equal to the predetermined threshold, authenticating the user and lowering the predetermined threshold for each user device associated with the user profile.

16. The non-transitory computer-readable medium according to claim 15, the method further comprising:

recording, for the user profile, an anomaly for the first type of authentication information;

receiving, from a second user device associated with the user profile, a request to access sensitive information subsequent to recording the anomaly; and sending to the second user device a request for a type of authentication information different than the first type of authentication information.

17. The non-transitory computer-readable medium according to claim 15, the method further comprising:

subsequent to lowering the predetermined threshold associated with the user device, receiving, from a second user device associated with the user profile, a request to access sensitive information;

sending to the second user device a request for a third accuracy measurement for the first type of authentication information, the second type of authentication information, or another type of authentication information;

determining a third accuracy measurement for the first type of authentication information, second type of authentication type of authentication information, or other type of authentication information;

determining whether the third accuracy measurement is above or equal to the lowered predetermined threshold associated with the second user device; and when the third accuracy measurement of the first type of authentication information is above or equal to the predetermined threshold, authenticating the user.

18. The non-transitory computer-readable medium according to claim 15, the method further comprising:

reverting the lowered predetermined threshold for each user device associated with the user profile to the predetermined threshold, after a predetermined amount of time has passed.

19. The non-transitory computer-readable medium according to claim 15, the method further comprising:

receiving a request to add a second user device to the user profile; and in response to receiving the request to add a second user device to the user profile, storing, in the user profile included in a memory of the electronic computing device, a unique identifier for the second user device, types of authentication information accepted by the second user device, and a predetermined threshold associated with the second user device.

20. The non-transitory computer-readable medium according to claim 15, wherein the predetermined threshold is a value, the first type of authentication information is a facial image, and the second type of authentication information is an audio clip of a voice.

* * * * *